(12) United States Patent
Mercuri et al.

(10) Patent No.: US 8,909,299 B2
(45) Date of Patent: Dec. 9, 2014

(54) MOBILE APPLICATION FOR AD-HOC IMAGE DISPLAY

(75) Inventors: Marc Mercuri, Bothell, WA (US); James Oliver Tisdale, III, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 13/284,998

(22) Filed: Oct. 31, 2011

(65) Prior Publication Data

US 2013/0109364 A1    May 2, 2013

(51) Int. Cl.
  *H04M 1/00* (2006.01)
  *H04B 1/38* (2006.01)
  *H04W 24/00* (2009.01)
  *G09G 5/00* (2006.01)
  *G09G 5/12* (2006.01)
  *H04M 3/42* (2006.01)

(52) U.S. Cl.
  CPC ..................... *H04M 3/42* (2013.01)
  USPC ........... 455/566; 455/456.1; 345/1.1; 345/1.3; 345/2.1; 345/2.3

(58) Field of Classification Search
  CPC ...... H04W 4/02; H04W 40/20; H04B 1/3888; H04M 1/0283; H04M 1/22; H04M 1/72544; H04M 1/72572; H04M 1/72575; H04M 2242/30; H04M 3/4228
  USPC .................... 455/456.1–457, 566, 41.1–41.3; 345/1.1–4
  See application file for complete search history.

(56) References Cited

U.S. PATENT DOCUMENTS

| | | | |
|---|---|---|---|
| 6,812,907 B1 | 11/2004 | Gennetten et al. | |
| 6,965,785 B2 * | 11/2005 | Mager et al. | 455/566 |
| 7,034,853 B2 * | 4/2006 | Cho et al. | 345/1.3 |
| 7,453,418 B2 * | 11/2008 | Palmquist | 345/1.1 |
| 7,532,196 B2 * | 5/2009 | Hinckley | 345/156 |
| 7,953,452 B2 * | 5/2011 | Bailey et al. | 455/566 |

(Continued)

OTHER PUBLICATIONS

Lyons, et al., "Multi-Display Composition: Supporting Display Sharing for Collocated Mobile Devices", Retrieved at <<http://berkeley.intel-research.net/~brosario/papers/interact09.pdf>>, 12th IFIP TC 13 International Conference on Human-Computer Interaction: Part I, 2009, pp. 14.

(Continued)

*Primary Examiner* — Matthew Sams
(74) *Attorney, Agent, or Firm* — Kevin Sullivan; Kate Drakos; Micky Minhas

(57) ABSTRACT

An ad hoc imaging capability allows a plurality of mobile devices to render an ad hoc image at a venue, such as a sports arena. A mobile ad hoc image ("MAHI") application can be downloaded to the spectators' mobile devices prior to the event. Seat location of a user is used by the MAHI application to select and display an image, which is a pixel of the ad hoc image. The ad hoc image can be animated or static. An authoring tool allows creation of an ad hoc image data structure whereby a previously created image or animation is mapped to the venue seating configuration. The ad hoc image data can be downloaded to, and cached by, the mobile device along with downloading the application, or the ad hoc image data can be streamed to the mobile device when the ad hoc image is to be displayed.

20 Claims, 10 Drawing Sheets

(56) References Cited

U.S. PATENT DOCUMENTS

| | | | | |
|---|---|---|---|---|
| 8,265,707 | B2* | 9/2012 | Carmichael et al. | 455/566 |
| 2003/0060974 | A1* | 3/2003 | Miyahara et al. | 701/209 |
| 2005/0168399 | A1* | 8/2005 | Palmquist | 345/1.1 |
| 2007/0232325 | A1* | 10/2007 | Oshime et al. | 455/456.1 |
| 2009/0160731 | A1* | 6/2009 | Schuler et al. | 345/1.1 |
| 2011/0109526 | A1* | 5/2011 | Bauza et al. | 345/1.3 |

OTHER PUBLICATIONS

Schmitz, et al., "Ad-Hoc Multi-Displays for Mobile Interactive Applications", Retrieved at <<http://www.graphics.rwth-aachen.de/uploads/media/schmitz_2010_egarea_01.pdf>>, Eurographics, 2010, vol. 29, No. 2, pp. 8.

Chen, et al., "Scalable alignment of large-format multi-projector displays using camera homography trees", Retrieved at <<http://ieeexplore.ieee.org/stamp/stamp.jsp?tp=&arnumber=1183793>>, conference on Visualization, Oct. 27-Nov. 1, 2002, pp. 339-346.

Hinckley, et al., "Stitching: Pen Gestures that Span Multiple Display", Retrieved at <<http://www.cs.cornell.edu/~francois/Papers/2004-Hinckley-AVI04-Stitching.pdf>>, Proceedings of the working conference on Advanced visual interfaces, 2004, pp. 1-8.

Tandler, et al., "ConnecTables: Dynamic coupling of displays for the flexible creation of shared workspaces", Retrieved at <<http://citeseerx.ist.psu.edu/viewdoc/download?doi=10.1.1.12.6473&rep=rep1&type=pdf>>, Proceedings of 14th annual ACM symposium on User interface software and technology, 2001, pp. 11-20.

Hinckley, Ken, "Synchronous gestures for multiple persons and computers", Retrieved at <<http://citeseerx.ist.psu.edu/viewdoc/download?doi=10.1.1.93.1671&rep=rep1&type=pdf>>, Proceedings of 16th annual ACM symposium on User interface software and technology, 2003, pp. 10.

Levy, Linda, "A Study of Sports crowd Behavior: The case of the great pumpkin incident," 1989, Journal of Sports and Social Issues, 13(2): 69-91.

* cited by examiner

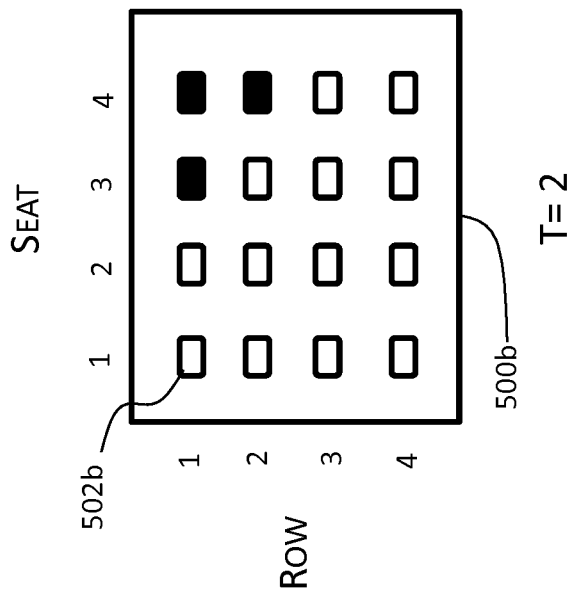
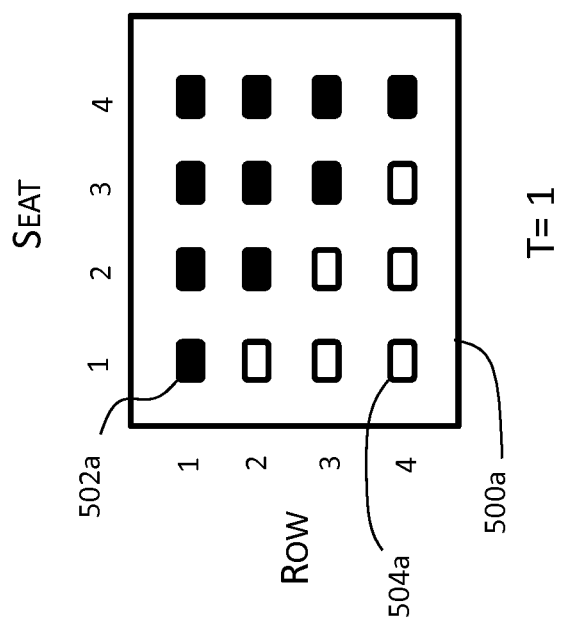
FIG. 5A

| Time Period | Location | Image Data |
|---|---|---|
| 1 | 1,1 | 1 |
| 1 | 1,2 | 1 |
| 1 | 1,3 | 1 |
| 1 | 1,4 | 1 |
| 1 | 2,1 | 0 |
| 1 | 2,2 | 1 |
| 1 | 2,3 | 1 |
| 1 | 2,4 | 1 |
| 1 | 3,1 | 0 |
| ... | ... | ... |
| 2 | 1,1 | 0 |
| 2 | 1,2 | 0 |
| 2 | 1,3 | 1 |

FIG. 5B

MOBILE APPLICATION FOR AD-HOC IMAGE DISPLAY

BACKGROUND

Large crowds regularly occur at sports venues, such as stadiums or coliseums. It is common at sport events for spectators to demonstrate team support, participate in crowd cheers, or otherwise exhibit enthusiastic behavior. In many cases, event moderators facilitate audience participation, especially at breaks during the event, by encouraging spectators to participate in some sort of crowd-oriented activity. Audience members are typically eager to participate, and can exhibit a cooperative collective crowd behavior that often occurs at such venues.

For example, one such crowd behavior commonly performed is a "wave" where audience members in a section standup or raise their arms as a group, section by section, so that a wave sweeps across the spectator stands. This activity requires synchronization of spectator activity. Generally, the better the synchronization the activity is with respect to time, the more impressive is the result.

The net effect of this group activity cannot be easily appreciated by any one spectator, or when viewed close up or looking at only one individual. Typically, the effect is appreciated only when entire sections of the stadium are viewed. Large-scale display screens are often provided at the venues allowing the audience to see the net effect. There is a natural willingness to participate in such activities where the net effect can only be detected when a large group participates in a cooperative manner. This is termed herein as cooperative crowd behavior and the events at which CCB is displayed is called a cooperative crowd event.

Most of the spectators engaging in cooperative crowd behavior are likely to be carrying a smart phone or mobile computing device of some sort. These devices are ubiquitous today, and they often incorporate a color display. Smart phones commonly allow application programs to be downloaded to provide additional services and functionality. These MAHI applications are commonly directed to entertainment purposes. Combining this capability with the willingness of users to participate in cooperative crowd behavior would offer various opportunities heretofore not available.

It is with respect to these and other considerations that the disclosure made herein is presented.

SUMMARY

Concepts and technologies are described herein for one embodiment involving providing large scale displays at public venues using mobile computing devices executing a MAHI application in a coordinate manner.

In one embodiment, a method for displaying an ad hoc image at a venue includes generating an ad hoc image data structure for an image wherein the ad hoc image data structure comprises a plurality of a set of pixels, wherein each set of pixels includes one or more plurality of ad hoc image pixels. The method includes providing a server configured for downloading a mobile ad hoc imaging application to a mobile device upon request to a user, and downloading the mobile ad hoc imaging application to the user. The mobile ad hoc imaging application is configured to cause the mobile device to receive input comprising location information of the user within the venue, synchronize display of the set of pixels, and display the set of pixels of ad hoc image pixels in the venue.

In another embodiment, a system for providing an ad hoc image displayed in a venue includes a server storing an ad hoc image data structure, where the ad hoc image data structure includes a plurality of ad hoc image pixels. The server further stores a mobile ad hoc image application configured to prompt the user for location information of the user within the venue, synchronize display of one of a plurality of ad hoc image pixels on a mobile device with respect to a timing reference, and display one of the plurality of ad hoc image pixels in the venue at a first time.

In another embodiment, a computer readable medium comprising instructions that when executed cause a mobile computing device to prompt the user for entry of a seat location in a venue and retrieve an ad hoc image data structure comprising an ad hoc image pixel associated with the seat location. The instructions further cause the mobile computing device to ascertain a time associated with displaying the ad hoc image pixel, determine a current time is the time associated with displaying the ad hoc image pixel; and display the ad hoc image pixel.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A and 5B illustrate an ad hoc image and an associated ad hoc image data structure;

DETAILED DESCRIPTION

Figure 1:
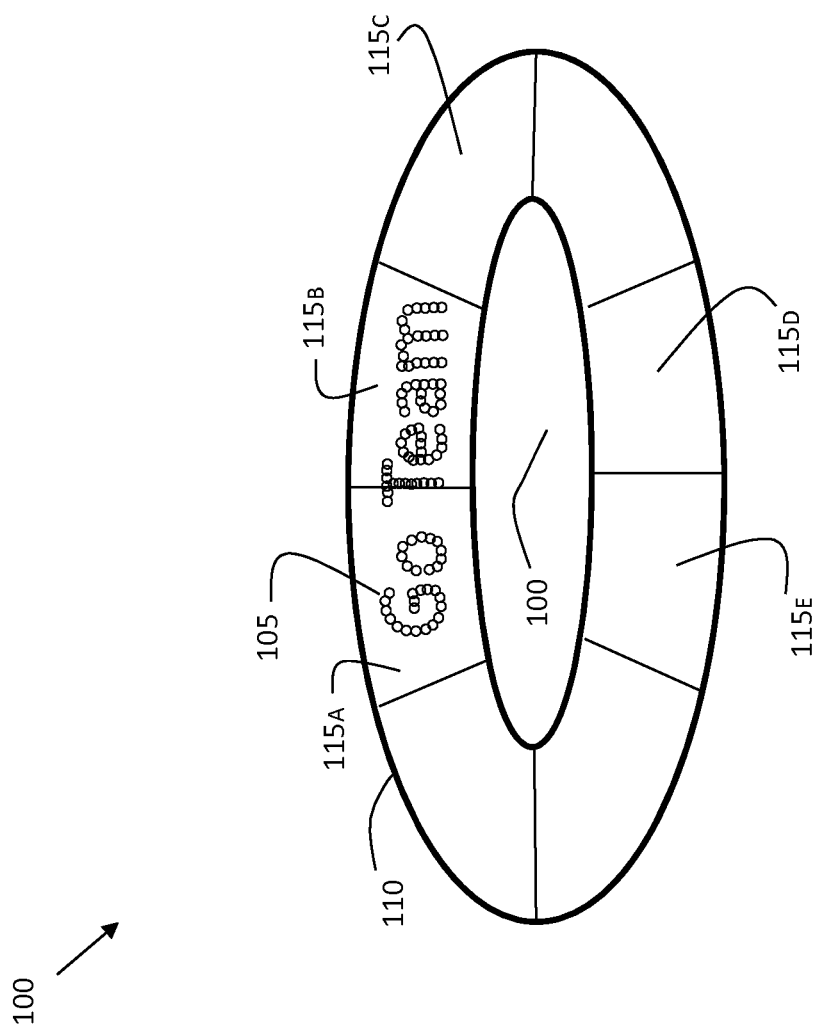
FIG. 1 is an illustration of a static ad hoc image provided at a public venue using a plurality of mobile devices.

The following detailed description is directed to utilizing a group of mobile devices in a coordinated manner to generate an ad hoc image. The ad hoc image is the image formed by the aggregate display from a plurality of mobile devices when viewed as a collective display. The mobile devices can be coordinated to provide ad hoc image in a synchronous matter by referencing a common time, which can be derived from a signal. In some instances, the group of mobile devices may be relatively small in number, e.g., six devices. In other instances, the group may involve thousands of mobile devices cooperating to display an image.

In one embodiment, the devices can be used in a coordinated manner to display an ad hoc image at a sports venue. The nature of the ad hoc image can vary, and could indicate support for a team, provide advertising, or generate an ad hoc image for group entertainment purposes. The ad hoc image is typically collectively displayed by spectators holding up their mobile device, such as a smart phone. The devices are coordinated in some manner to each display a portion of the overall image. Thus, each mobile device can function to display a pixel as part of the larger, collective display. In other embodiments, each mobile device can function to display a group of pixels as part of the larger, collective display.

In the following detailed description, references are made to the accompanying drawings that form a part hereof, and which are shown by way of illustration specific embodiments or examples. Referring now to the drawings, in which like numerals represent like elements throughout the several figures, aspects of a system are presented for performing a coordinated image presentation in crowd.

To illustrate the context for one embodiment of the concepts disclosed herein, FIG. 1 is referenced. In FIG. 1, a sports stadium 110 is represented surrounding a playing field 100. The stadium comprises various sections 115a-115c, each of which can each hold hundreds of spectators. As is well known, stadiums may routinely seat thousands of spectators. The number and configuration of the sections can vary. Each spectator is assigned a seat in a section, which is typically defined by a row and seat number. For illustrative purposes, a spectator is presumed to be in location of their assigned seat, and hence "spectator" and "seat" may be used interchangeably in certain contexts.

In this embodiment, a group of spectators are displaying their mobile phones (e.g., by holding them upwards) so that collectively a message 105 ("Go Team") is observed. The message 105 is composed of individual images on mobile devices each acting as a pixel. In other embodiments, the mobile devices may display a set of pixels. FIG. 1 shows a static message 105, and it should be appreciated that other types of static image can be displayed. The image could be in color, or black and white, and various effects can be provided.

While the overall ad hoc message may not be readily discernable to the spectators generating the ad hoc image in sections 115a or 115b, it may be discernable to the spectators seated in the sections on the opposite side, namely in sections 115d and 115e. Further, a television that captures the ad hoc image of sections 115a and 115b on a large display screen could make the message discernable to the spectators in the stadium. In many venues, a blimp may fly over the stadium to obtain overhead television images of the stadium as a whole. In these types of television images, the ad hoc image would likely be visible at this perspective.

Figure 2:
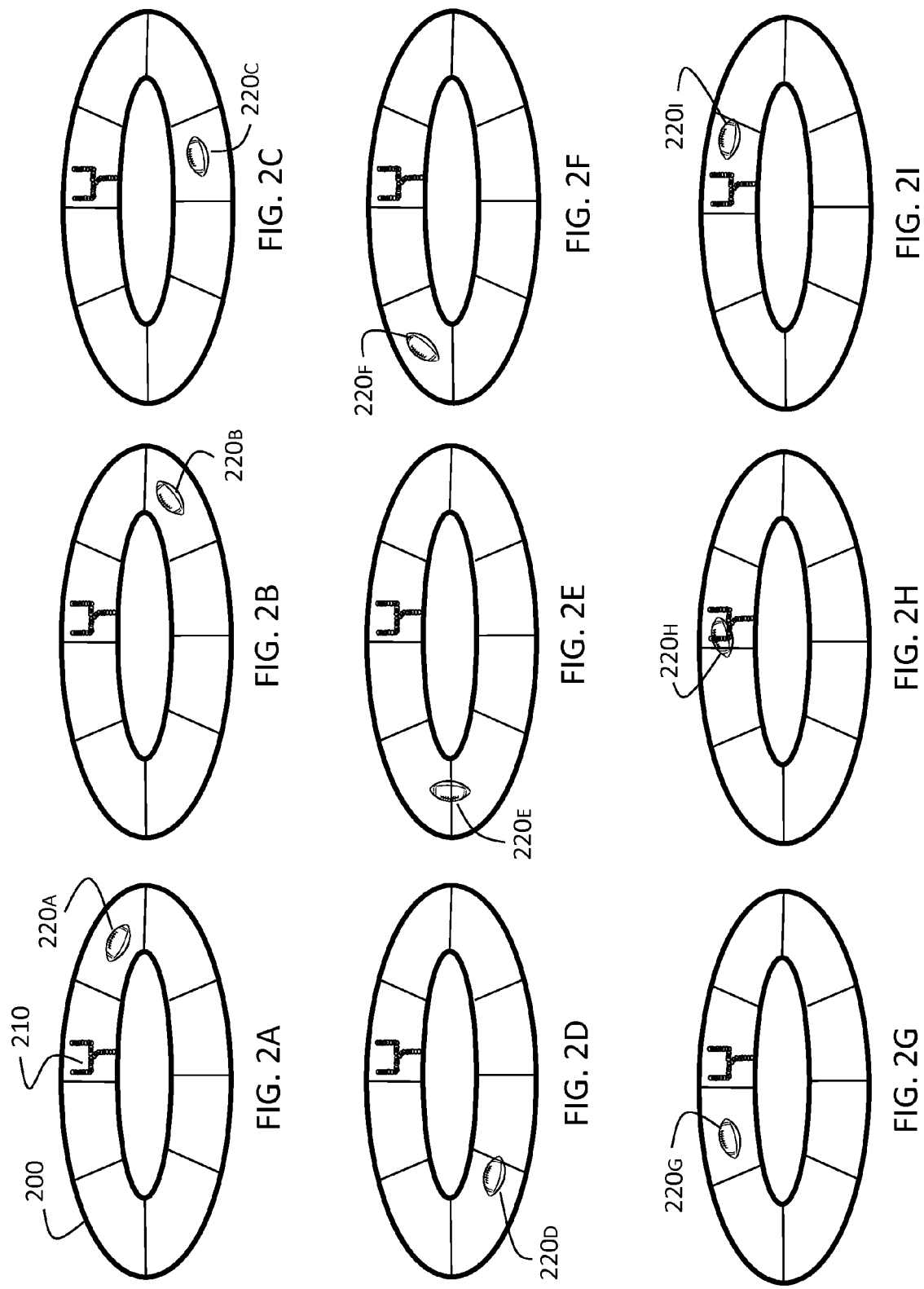
FIGS. 2A-2I illustrate an animated ad hoc image provided at a public venue using a plurality of mobile devices.

In FIG. 2, an animation (a.k.a. animated ad hoc image) can be produced as well. This animation is shown as a series of time-base representations of the ad hoc image generated at various locations in the stadium. The animation may be comprised of both static and animated images. An animated image can be decomposed into a plurality of static images that vary at certain times. In FIG. 2A, the stadium has a stationary image of a goalpost 210 produced by spectators holding up their synchronized mobile devices which collectively form the static ad hoc image. An image of a football 220a is also produced that moves to an adjacent section as shown in FIGS. 2B-2I. In this manner, the football image appears to "run-around" the stadium and pass through the goalposts in FIG. 2H. Various other types of abstract images or light patterns, colors, etc. could be generated.

In principle, the animation described above created is similar in concept to so called "light chaser" patterns that have been used in signs for many years. Light chaser signs involve selectively turning on and off many individual light bulbs in synchronization so as to create an animated effect. Providing animated ad hoc images requires synchronizing the operation of the mobile devices with respect to their time and location.

Figure 3:
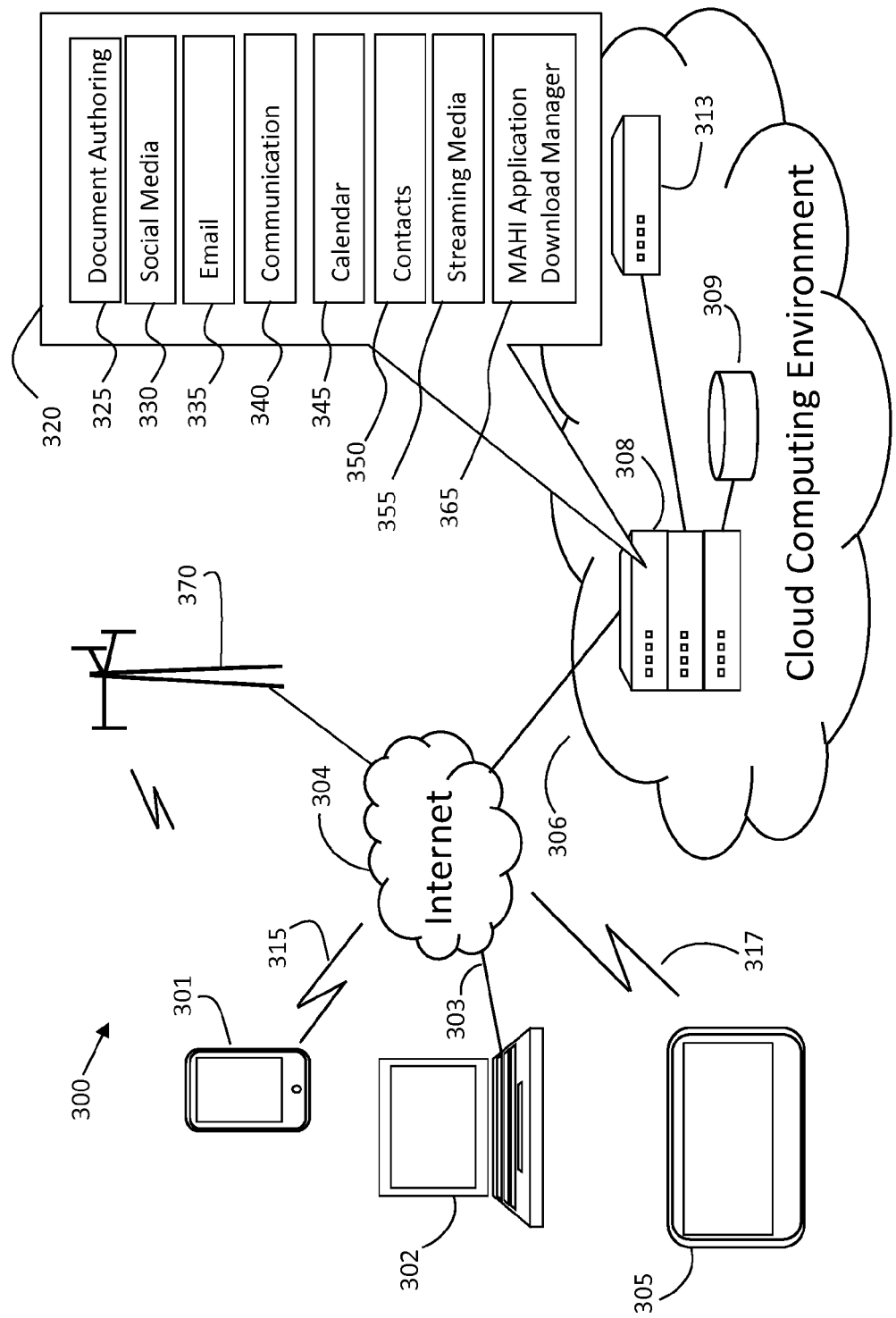
FIG. 3 is a context of a system for providing MAHI applications to a plurality of mobile devices.

The operating context for accomplishing ad hoc imaging is shown in one embodiment in FIG. 3. FIG. 3 illustrates a cloud computing environment 360 which can be accessed by a plurality of user computing devices such as a smart phone 301, a laptop 302, and tablet computing device 305. Typically, these devices access a communications network, such as the Internet 304, by using various wireless connections 315, 317 and wired connections 303. Although the illustration presented herein focuses on users using a mobile device such as a smart phone 301 or tablet computing device 305 to a venue, the concepts disclosed herein can be practiced using a laptop 302 or other stationary type computing device.

The wireless connections for the devices can be based on various readily available technologies, including the various cellular based technologies (CDMA, GSM, 4G, EDGE, etc.) originating from cellular infrastructure 370 provided by a cellular service provider or other wireless technologies (e.g., WiMax, WiFi, etc.) The wired technologies can be based on ISDN, cable modems, DSL, and other well known forms.

The connectivity afforded by the wired and wireless communications through the Internet provides the mobile devices with access to servers 308 in the cloud computing environment 306. These devices can download the mobile ad hoc imaging application ("MAHI application") from the server 308 as necessary. Although the concepts illustrated herein refer to a single server 308, there may be various servers involved. For example, one server 308 accessed by a device may in turn access another server 313. A plurality of download servers may be used in another embodiment.

The server 308 may execute various application programs 320. These may be executed in a shared or distributed manner across one or more servers. The application programs may include a document authoring application 325 for creating documents, such as word processing programs. The application programs may include social media applications 330 for group related messaging and communications. Another application program present may be an email application 335 may allow for various messaging capabilities, including instant messaging. A communications application 340 may allow for video chat or voice communication. A calendar application 345 may allow for organizing meetings and events. A contact application 350 may allow for organizing contact information for individuals. A streaming media application 355 may provide for streaming digital data, such as audio or video files. Each of these applications may store data, which the server 308 maintains in a data store 309, which can comprise various storage systems.

Finally, a MAHI application download manager 365 is shown as well. This is the application which manages the downloading of the ad hoc imaging MAHI application to users. It also may store the ad hoc image data in the data store 309. This application can also function as an authoring tool to create the MAHI application as well as the ad hoc image data. Other variations are possible. For example, a separate authoring tool can be used to create the ad hoc image data.

Figure 4:
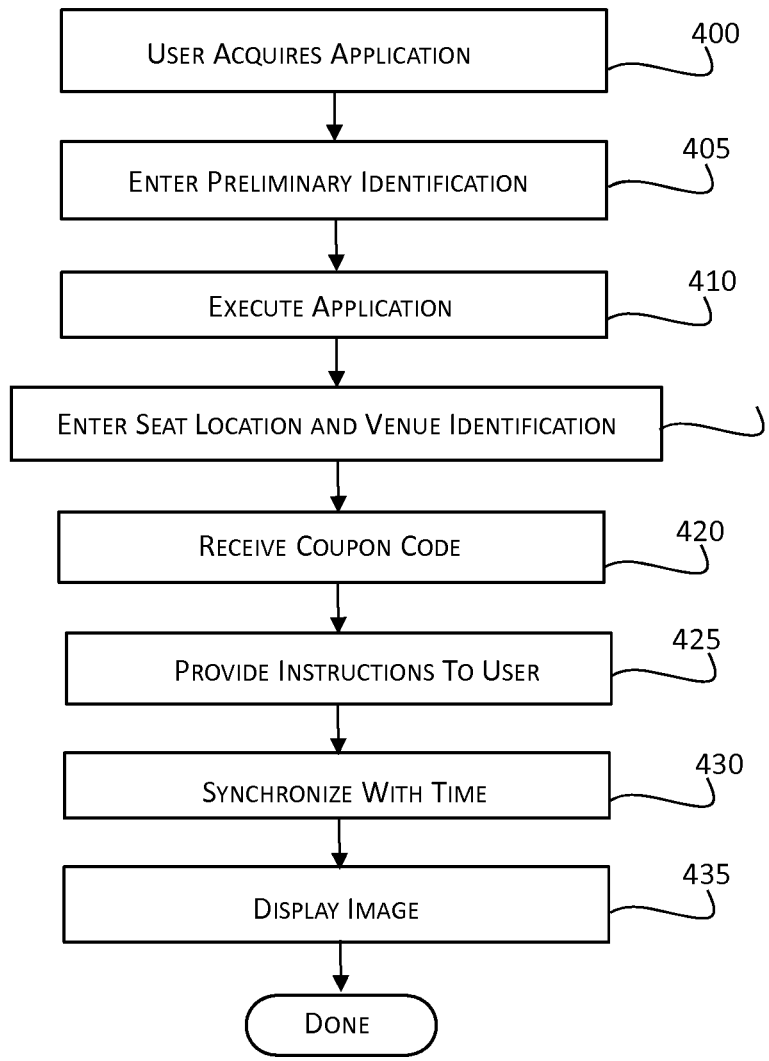
FIG. 4 is a process flow for using a MAHI application by a user for providing an ad hoc image.

The process for a user participating in displaying an ad hoc image is shown in FIG. 4. This is illustrated in the context of a user attending a sports event, but the concepts are not limited to this application and can be applied to other events and venues. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 4 and described herein. These operations may also be performed in a different order than those described herein.

In FIG. 4, the user downloads the MAHI application for their smart phone in operation 400. The MAHI application can be downloaded by the user at the sports venue, but in many instances the user may download the MAHI application prior to arriving at the sports venue. This can avoid any potential network delays if thousands of users are requesting to download the same MAHI application within a narrow time window. Downloading may occur via conventional means as is well known to those skilled in the art.

The user can be made aware of the MAHI application and encourage to download it in various ways. The user may be informed by a notice printed on a ticket, on a flyer provided to spectators, or advertising placed by a merchant sponsoring the event at the sports venue. Other forms such as billboards, electronic signage, email messages, or other information technologies can be used to indicate the web address (e.g., Uniform Resource Locator) to obtain the MAHI application. In some embodiments, the MAHI application can be obtained from an "application store" or combined with other marketing information.

One approach for facilitating users downloading the MAHI application is to provide a quick response ("QR") code that identifies the web site for providing the MAHI application. QR codes are commonly used to direct a mobile user to a web site, and comprises a small black and white matrix bar code that can be read and interpreted using a smart phone. By incorporating the QR code with advertising or some other printed media form such as the ticket or flyer, the user can be easily directed to the web site for downloading the MAHI application.

Once the user downloads the MAHI application, then in operation 405 the user may be prompted to enter identification information. This step is optional, and the identification may comprise the user's name, email address, etc. This information can be used in conjunction with promotional opportunities associated with the event sponsor. For example, the MAHI application may be developed or provided by a retailer providing an advertising message and thus sponsoring the MAHI application. The sponsor may provide the MAHI to the spectator on the condition the user provides contact information to populate a marketing database. Alternatively, the sponsor may provide a coupon or other incentive for the user to enter identification information. In other embodiments, the ad hoc imaging data for that user may be emailed to the user separately from the MAHI application.

Once any required identification information is provided in operation 405, the MAHI application is ready to execute. In some embodiments, the MAHI application may be restricted from being executed until all information requested in operation 405 is provided. In operation 410 the MAHI application is executed. This may occur once the user arrives in the sports venue and is prompted to activate the MAHI application. In other embodiments, the MAHI application may provide information about the event, including information about the players, coaches, team statistics, etc.

Once the user knows their seat location, the user can provide this information to the MAHI application. In one embodiment, the MAHI prompts the user to enter the seat location. This can be done prior to entering the sports venue or afterwards. In many cases, location information is first known when the user obtains the ticket, and this may not be known until the user is at the venue.

In operation 415 the user enters their seat location. The location information could be a section number in the stadium or a more precise location, such as a section number, row number, and seat number. The location information is used to provide a basis for providing display contents on the mobile device. The location information can be used to provide different light intensities, colors, or display control (e.g., flashing). The location information can be used by the MAHI application to select what data is to be displayed at what times. In other embodiments, the location information can be communicated from the MAHI application to the web site providing the application, where image and control data is then configured for that particular user. This will be discussed further below in regards to the data structure used by the MAHI application to control the display.

In other embodiments, location information may be derived from GPS or other positioning related data. In still other embodiments, the seat information may be determined after the user provides their name, which is then correlated to a seat location based on the user's name.

Without any location information of the user, the application can still control the display of the mobile device, but only with respect to time. In this configuration, the mobile devices can collectively be synchronizes to turn on/off at a given time, but more intricate ad hoc imaging requires the ability to control the mobile devices based on time and location.

The user may receive in operation 420 a coupon or promotional award in response to completing the above operations. The promotional award could be for a free drink at the stadium concession, discount on merchandise, etc. This step is not necessary to practice the concepts disclose herein, but encourages the user to complete the process. In other embodiments, the award may only be provided in response to the user actually participating in the ad hoc imaging event. In other embodiments, the user may receive other forms of concessions or information.

In operation 425 the MAHI application may provide instructions to the user as to how to participate in the ad hoc imaging event. The instructions may direct the user to how to hold their device or inform the user as when the group ad hoc imaging events are scheduled. Typically, in order for the crowd to see the ad hoc image, the users must position their mobile device so that other spectators at large can see the device. Thus, users may be instructed to hold the device in an upward direction, as opposed to holding the mobile device in front of their face. Users may have to be reminded to position their devices in this manner in order to achieve the overall desired effect.

The MAHI application in the various mobile devices should be synchronized with respect to time in some manner for the ad hoc display image to be effectively presented. The degree of time synchronization required depends on various factors, so various levels of synchronization may be suitable. The synchronization may occur in operation 430 in various ways.

In one approach the users are not directly involved in synchronizing the devices, as this occurs by operation of the MAHI application. For example, MAHI application could be programmed to refer to the current time as maintained by the mobile device and display an image at a given time. Many smart devices can derive the time from cellular provided control signals or GPS signals. This requires the MAHI application to know what time to begin displaying the ad hoc images. The starting time could be scheduled at a given time during the half-time event. The time could be programmed into the MAHI application wireless, or broadcasted via wireless signaling at the venue. Alternatively, the MAHI application could be instructed to monitor a broadcast control channel that signals when all devices executing the application to begin displaying the MAHI. This direct control approach is likely to provide a fairly high level of synchronization.

Another approach for synchronizing the MAHI application is to rely on the user manually synchronizing their devices. The users could be asked to enter the starting time into the MAHI application. Alternatively, the users may be asked to begin executing the MAHI application, or indicating a "start" function on the application. This provides a lower level of synchronization, but may be sufficient for the purpose of providing the ad hoc image. For example, an announcer at the stadium could request all users to begin execution of the application. The users may be prompted to provide the starting time, or enable the MAHI application to monitor an external signal. Upon commanding the audience to enter input, the devices would be more-or-less synchronized at the same time.

Another variation would be for all users to execute the application, and the application is programmed to enable audible reception and recognition using the built-in microphone in the mobile device. The announcer could then blast a horn at the stadium to synchronize the mobile devices.

In another embodiment, a cellular broadcast short message service message could be wirelessly transmitted to the mobile devices using cellular infrastructure 370. The mobile phones would then synchronize based on this message or command. This requires cooperation with one or more a wireless carriers. If more than one wireless carrier is involved, then these may have to be involved to synchronize transmission of their messages or commands.

Those skilled in the art may devise other approaches for synchronizing the devices. The techniques used may vary based on the number of users involved, network capacity, and other considerations.

In operation 435 the mobile devices display their respective image. Each mobile device could function as a pixel or a group of pixels in the overall ad hoc image. A pixel could be defined as the most elemental of images that can be displayed in the ad hoc image. The pixel image may involve, e.g., displaying one or more colors or effects on the mobile device, varying the intensity, etc. Displaying the pixel image may also encompass the mobile device not displaying anything (e.g., displaying a blank screen).

The above operations can occur in a different order, and not all the above operations are required to be performed. Further, various sub-operations involved in each operation may be accomplished in different ways. The techniques used can also vary based on the number of users involved.

The data representing the ad hoc image may comprise individual display information for thousands of users. Providing the image data to be displayed can be provided to the mobile devices in at least one of two ways. First, the data for the mobile display can be downloaded with the MAHI application and cached locally. After synchronization, the mobile device may access the locally stored data and display the image accordingly. The image data transmitted with the MAHI application could comprise only the image data for the mobile user or for the entire ad hoc image. In the former case, the user would have to provide seat location information so that the appropriate subset of the image data can be determined for the user.

The image data could be provided in a second approach involving real time streaming of the image data at the venue. The MAHI application receives the broadcast image data and displays the appropriate portion of image data in real time. In this embodiment, a broadcast channel may be used to transmit the data to all the users. In other embodiments, individual data connections to all the mobile users may be established.

In the first approach, the image data is downloaded when the application is downloaded. Although there may be thousands of mobile devices in a stadium, the memory requirements to store the image data may be relatively modest. To illustrate this point, reference is made to FIG. 5A.

In FIG. 5A, a section 500*a* of a stadium is schematically illustrated and comprises sixteen seats. These can be classified as a matrix of rows and seats. For example, there is a seat 502*a* located in the first row and first seat. FIG. 5A illustrates how a portion of the ad hoc image would appear at a given time. The representation of this seat 502*a* as being blacked-out represents that the mobile device is actively displaying an image (as opposed to displaying a blank screen). This mobile device may be considered as providing one pixel in the overall ad hoc image, and so it may not be possible to discern the entire ad hoc image based on this section alone. In other embodiments the pixel may be a color, or other shaped image.

Other locations in this seating section, such as 504*a*, are shown as not being filled-in. This represents displaying a blank screen by the mobile device in that location. For convenience, seats in this section are referred to as a (Row, Seat) value. Hence the first seat 502*a* in this section is referred to as seat (1,1). The stadium section 500*a* is shown for a given time, which in this embodiment is at T=1. This section at T=1 shows that an a portion of the ad hoc image is displayed by the mobile devices located at seats (1,1), (1,2), (1,3), (1,4), (2,2), (2,3), (2,4), (3,3), (3,4), and (4,4). The other seats present a blank display.

The same section 500*b* is shown at T=2. The collective image has changed, so that the seat (1,1) 502*b* is no longer showing an image, but is blank. At T=2, only locations (1,3), (1,4), and (2,4) are actively showing an image. It should be appreciated that in this example, each device is programmed to actively display a portion of the ad hoc image or present a blank display. Providing a blank display can be referred to as not providing a portion of the ad hoc image, but the MAHI application is still controlling the display even if no image is visible.

The associated data structure 530 shown in FIG. 5B represents the ad hoc image data for the collective ad hoc image and is termed the ad hoc image data structure 530 (or simply "data structure" herein). The data structure 530 comprises a series of records comprising a first field 540 defining a time period, a second field 542 defining a location, and a third field 544 defining an image data value. The time period defines when the image data should be presented. This can be an absolute time, or a time from the beginning synchronization time. The location refers to a particular seat location, which in this example retains the (Row, Seat) format. Other embodiments may have other formats. The image data value represents the image to be presented. In this example, the values are binary, with 0 being inactive, and 1 being active. In other embodiments, values indicating color, hue, intensity, etc. could be indicated.

For example, the first record 531 is for the first time period, and indicates that the mobile device at seat (1,1) 502*a* has an image data value of 1. There are records for each of the remaining seats in the seating section with the corresponding image value for the first time period. The data structure has another record 532 that defines image data values for the same locations for the second time period. For example, record 532 is the record for the seat (1,1) 502*b* at time period 2. At this time, the mobile device for this location 502*b* is inactive. Thus, the data structure 530 can define the image data for all the seats for each time period.

In one embodiment, the time period is in the range of 0.1 to 0.5 seconds. Other values may be used. The time periods can be denoted as regular time intervals from a common starting point, or each can be defined by referencing a beginning starting time for that time period. Other techniques can be developed by those skilled in the art.

Because the storage capability of mobile devices is relatively large, it is possible to cache the entire ad hoc image data structure in the mobile phone. Further, once the MAHI application is aware of the seat location, it is not necessary to store the image data for other seat locations. This significantly reduces the storage occupied for the mobile device should storage capacity be a constraint. In other embodiments, the user may indicate a seat location prior to downloading the application, so that the only the appropriate image data for that location is downloaded with the MAHI application.

Figure 6A:
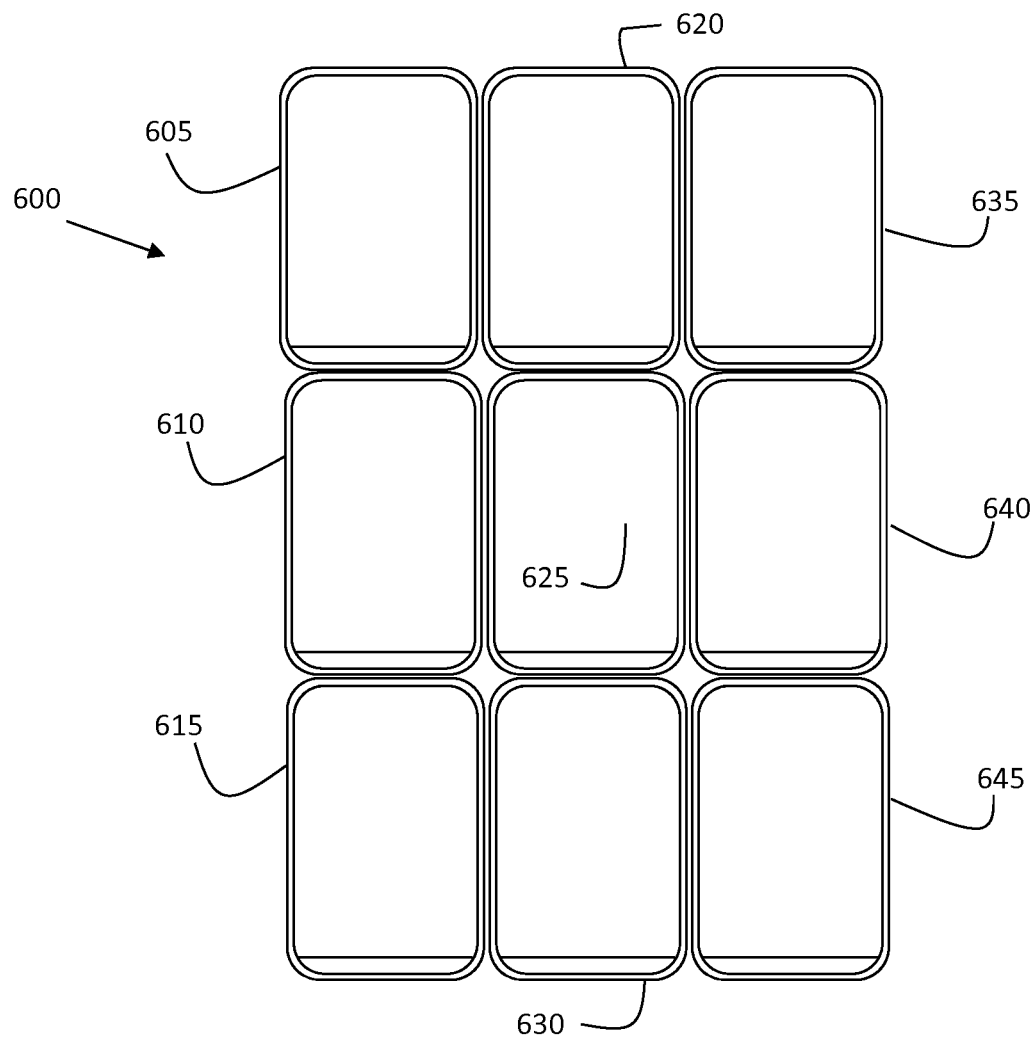
FIGS. 6A and 6B illustrate a configuration of mobile devices and a process flow for using a MAHI application for providing an ad hoc image.
Figure 6B:
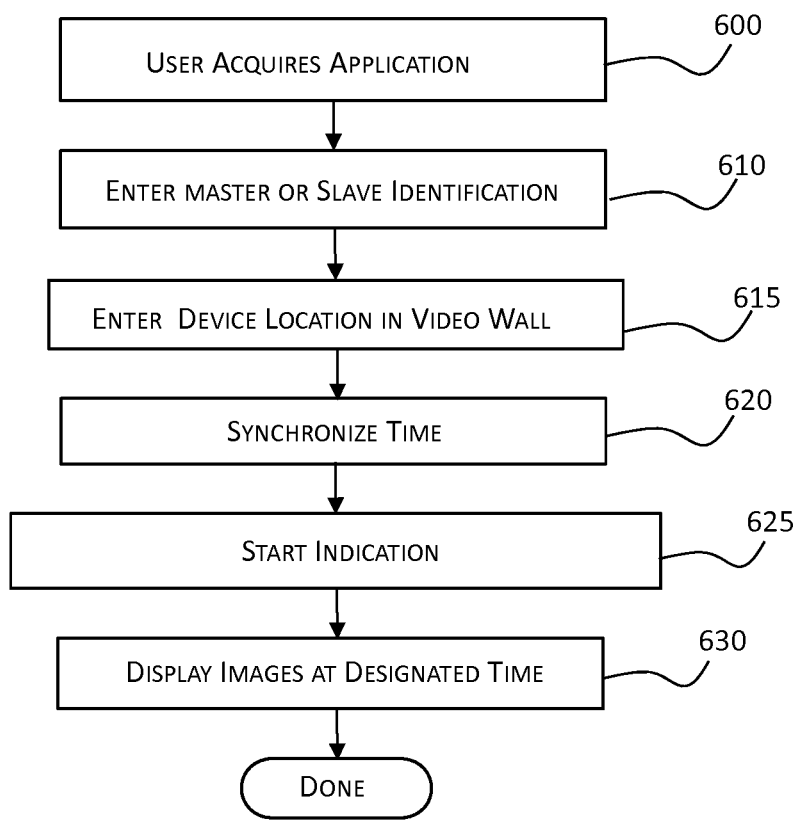

In other applications, the number of devices may be relatively few. For example, in another embodiment 600 shown in FIG. 6, nine tablet computing devices 605, 610, 615, 620, 625, 630, 635, 635, 640 and 645 are arranged to form a video-wall like presentation arrangement. In this embodiment, while the images are still ad hoc, fewer displays are used to comprises the collective ad hoc image. The collective image is typically presented for a smaller audience than a stadium.

In this scenario, the control may be provided by a single individual that owns one of the tablet computers as opposed to a third party. This arrangement could be used for a presentation format at a trade show, school, business meeting, social gathering, etc. In this embodiment, the individual coordinating the display, termed the administrator, coordinates the downloading of applications to the mobile devices in operation 600.

The MAHI application may be configured then to allow the administrator to indicate one of the devices as a master and the others as slaves in operation 610. This allows the administrator to use one of the mobile devices to control the presentation on all of the mobile devices. The administrator may define for each device its location in the video wall by interacting with the MAHI application. The indication could be using a matrix type arrangement where a row and column value is indicated. The administrator in operation 620 synchronizes the mobile devices to a time value, and in operation 625 indicates that the presentation should be started. The images in operation 530 are then displayed at the same time. If the ad hoc image is a static image, then the need for synchronization between the devices is less than if animation or video images are presented.

This approach may rely on the administrator interacting with the master MAHI application, which sends a message to a network based server causing a broadcast command to be sent to the mobile devices as described before. Other forms of synchronization as described before can be used.

This arrangement can be used for other applications, including games and puzzles. In one embodiment a video puzzle can formed. This application is similar to the above application in that a small number of devices may be involved, and instead of a vertical wall, the devices may be arranged on a table. However, the players are not aware of which mobile device is assigned to which position in the video wall. To begin the puzzle, the ad hoc image is displayed on the plurality of devices. The player then has to organize the devices in the proper arrangement to present a cohesive ad hoc image.

Attention is now given to the process of creating the MAHI application. The MAHI application can be created using an application program that converts an animated or static image into an appropriate data structure based on the venue so that the data structure can be interpreted by each mobile device on a location specific basis. This tool is referred to an ad-hoc image authoring tool.

Figure 7:
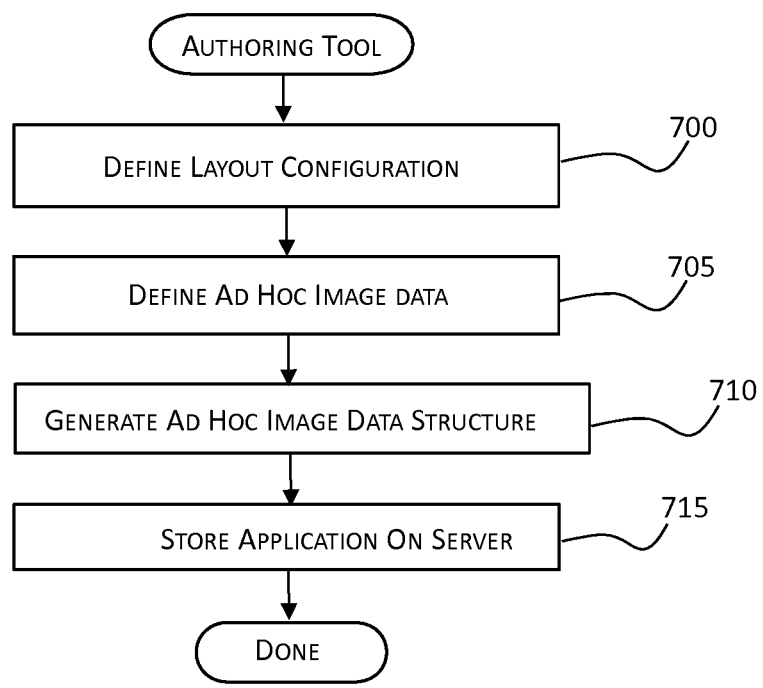
FIG. 7 illustrates a process flow for using an authoring tool to create a MAHI application for generating an ad hoc image.

The process is shown in FIG. 7. In operation 700 the user defines a layout configuration of the venue at which the CCE is to occur. This requires defining how the venue is configured and which portions of the venue will be used to present the ad hoc image. This may be defined on a venue specific basis. This may require defining section and row configurations in the venue.

The authoring tool allows designing how the ad hoc images could be presented at the venue. Ad hoc images could be displayed in particular sections or in the entire venue. Since the effectiveness of the ad hoc image depends on spectator participation, consideration may be given to avoiding using sections of the venue that may be sparsely populated. Thus, an effective display area may be bounded by certain portions of the venue.

In operation 705, the image(s) that is to be the basis of the ad hoc image is defined. This may comprise a static graphic image, animated video, or animated graphics, or other form. These images may be created using conventional graphical authoring tools.

In operation 710, the authoring tool applies the venue seating configuration to the image file to create the ad hoc image data structure. This involves subdividing the image into the appropriate sections that is defined as the display area. The image attributes, including color and/or intensity are determined for each location for each time period. In a simple embodiment, the effective display section could comprise an area of 30 rows by 50 seats, which provides 150 locations. The image is then divided into 150 pixels, with each pixel assigned to a corresponding location. Thus, the scale of the ad hoc image may have to be adjusted to fit the desired presentation area.

The time period may also be adjusted to define how long a static image should appear or how fast an animation effect will appear. For example, depending on the venue and ad hoc image animation effect, the timing of the animation may be different than what a user would experience with a mobile device. For example, conventional devices may present animations at 30 or 60 frames per second. This may be too fast for effective viewing of an ad hoc image, and so the ad hoc animation may occur at a much slower rate.

The authoring tool is then able to create an ad hoc image data file in a structure that the application program is configured to process. Although one embodiment of the structure was shown in FIG. 5B, other variations are possible.

Once the ad hoc image data structure is defined, then the application can be stored on the appropriate server in operation 615 where it can be accessed and downloaded by user. In some applications the ad hoc image data structure is provided with the application when downloaded, in other applications the data structure can be streamed to the user at the venue when the image is to be displayed.

Figure 8:
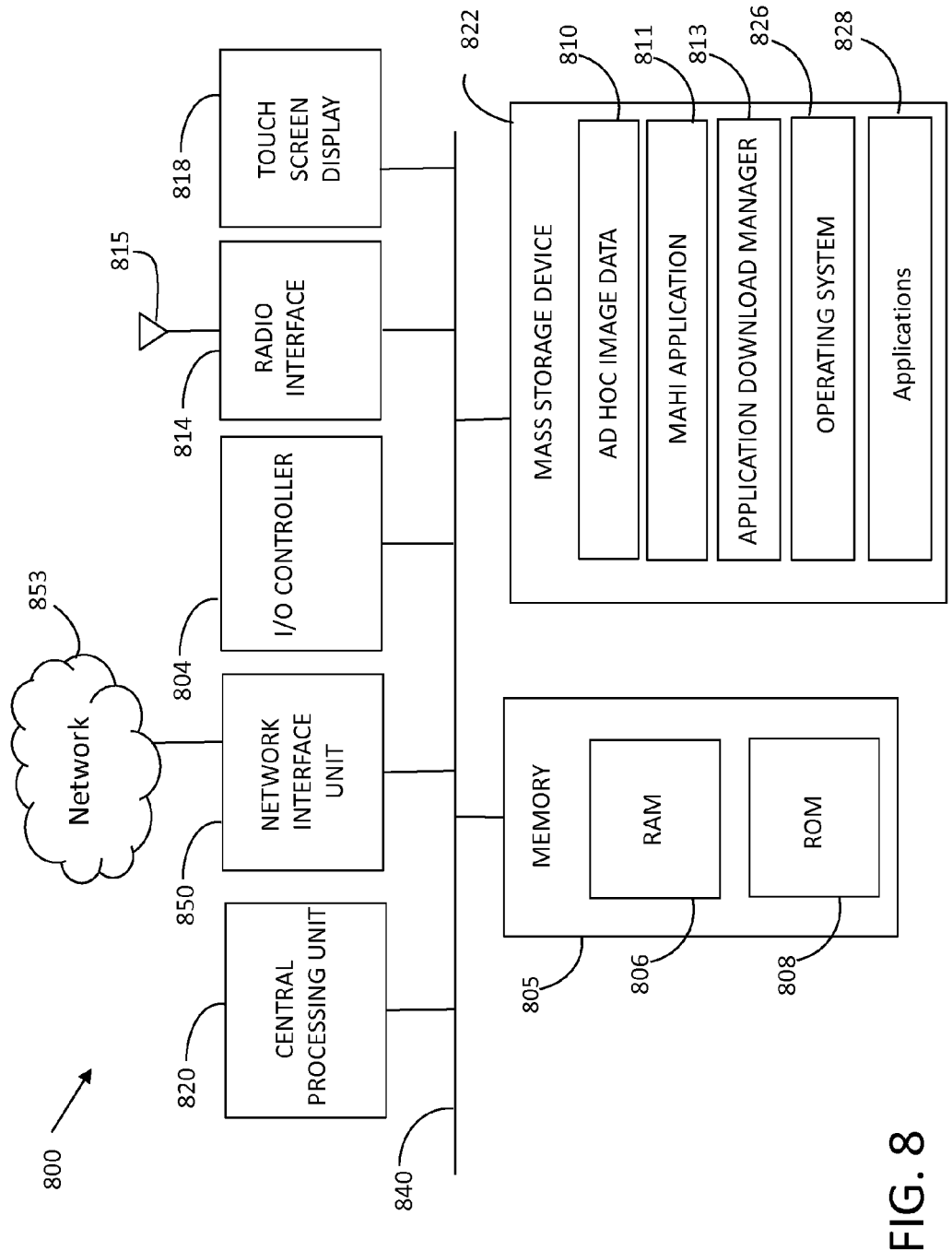
FIG. 8 illustrates an architecture for a computing device capable of of implementing the process flows.

The process flow described above and other related functions can be implemented in one embodiment by the computing architecture of a server comprising a processing device 800 as shown in FIG. 8. FIG. 8 shows an illustrative computing architecture for a computing processing device capable of executing the software components described. Although FIG. 8 describes the server 308, the computer architecture shown in FIG. 8 may illustrate a conventional server computer, laptop, tablet, or other type of computer utilized to execute any aspect of the software components presented herein. Other architectures or computers may be used to execute the software components presented herein.

The computer architecture shown in FIG. 8 includes a processor 820 (a.k.a. as a centralized processing unit or "CPU"), a system memory 805, including a random access memory 806 ("RAM") and a read-only memory ("ROM") 808, and a system bus 840 that couples the memory to the CPU 820. A basic input/output system containing the basic routines that help to transfer information between elements within the server 800, such as during startup, is stored in the ROM 808. The computer 800 further includes a mass storage device 822 for storing an operating system 828, application programs, and other program modules, as described herein.

The mass storage device 822 is connected to the CPU 820 through a mass storage controller (not shown), which in turn is connected to the bus 840. The mass storage device 822 and its associated computer-readable media provide non-volatile storage for the processing device 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

It should be appreciated by those skilled in the art that computer-readable media may be any available media that can be accessed by the computer 800, including computer-readable storage media and communications media. Communications media includes transitory signals. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the processing device 800, but the computer readable media does not encompass transitory signals.

According to various embodiments, the processing device 800 may operate in a networked environment using logical connections to remote computers or servers through a network (not shown in FIG. 8). The processing device 800 may connect to the network 853 using an antenna 815 connected through a radio interface unit 814, which in turn connected to the bus 840. It should be appreciated that the radio interface unit 814 may also be utilized to connect to other types of networks and remote computer systems and for sending signals to the mobile device 301. In other embodiments, connection to other types of network may be accomplished using an input/output controller 804. The input/output controller 804 can be used for receiving and processing input from a number of other devices, including a keyboard, mouse, or electronic stylus (not shown in FIG. 8). Similarly, an input/output controller 804 may provide output to a display screen, a printer, or other type of output device (also not shown in FIG. 8). In one embodiment, the computing device may incorporate a touch screen display 806. The touch screen display 806 functions to not only display information, but also to receive input from the user, including inputting text, commands, and controls.

As mentioned briefly above, a number of program modules and data files may be stored in the mass storage device 822 and RAM 806 of the processing device 800, including an operating system 828 suitable for controlling the operation of a networked desktop, laptop, tablet or server computer. The mass storage device 822 and RAM 806 may also store one or more program modules or data files. In particular, the mass storage device 822 and the RAM 806 may store the MAHI application 811 which is downloaded to the mobile devices. In addition, the ad hoc image data structure 810 configured for a particular venue may be stored as well. This may be downloaded separately from the MAHI application, or it may be integrated and included when the MAHI application is downloaded.

The application download manager 813 coordinates the downloading of the MAHI application 811 and the ad hoc image data 810 to the various users. The mass storage device 822 and the RAM 806 may also store other types of applications 828 and data.

It should be appreciated that the software components described herein may, when loaded into the processor 820 and executed, transform the processor 820 and the overall processing device 800 from a general-purpose computing system into a special-purpose computing system customized to facilitate the functionality presented herein. The processor 820 may be constructed from any number of transistors or other discrete circuit elements, which may individually or collectively assume any number of states. More specifically, the processor 820 may operate as a finite-state machine, in response to executable instructions contained within the software modules disclosed herein. These computer-executable instructions may transform the processor 820 by specifying how the processor 820 transitions between states, thereby transforming the transistors or other discrete hardware elements constituting the processor 820.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the processing device 800 in order to store and execute the software components presented herein. It also should be appreciated that the processing device 800 may comprise other types of computing devices, including hand-held computers, embedded computer systems, personal digital assistants, and other types of computing devices known to those skilled in the art. It is also contemplated that the processing device 800 may not include all of the components shown in FIG. 8, may include other components that are not explicitly shown in FIG. 8, or may utilize an architecture completely different than that shown in FIG. 8.

Based on the foregoing, it should be appreciated that systems and methods have been disclosed for providing ad hoc imaging using mobile devices carried by spectators in a crowd at a venue. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A method for displaying an ad hoc image at a venue comprising:
generating an ad hoc image data structure for the ad hoc image wherein the ad hoc image data structure comprises a plurality of a set of pixels, each set of pixels comprising one or more plurality of ad hoc image pixels;
prompting a user to enter identification information;
determine a seat location within the venue for the user based on the identification information;
providing a server configured for downloading a mobile ad hoc imaging application to a mobile device upon request to the user; and
downloading the mobile ad hoc imaging application to the user,
wherein the mobile ad hoc imaging application is configured to cause the mobile device to
receive the seat location within the venue for the user,
synchronize a display of the set of pixels comprising the one or more plurality of the ad hoc image pixels to a timing reference, and
display the set of pixels comprising the one or more plurality of the ad hoc image pixels in the venue.

2. The method of claim 1, wherein generating the ad hoc image data structure comprises adapting an image to a seating configuration of the venue to create the set of pixels associated with the seat location in the venue.

3. The method of claim 2, wherein the set of pixels is further associated with a time for displaying.

4. The method of claim 3, wherein downloading the ad hoc imaging application comprises
providing a quick response ("QR") code identifying a web site providing the ad hoc imaging application and
downloading the ad hoc image application from the web site, wherein the ad hoc image application comprises the ad hoc image data structure comprising the set of pixels.

5. The method of claim 3, wherein the seat location comprises a section number, a row number, and a seat number.

6. The method of claim 5, wherein the display of the set of pixels comprises a display of one of the plurality of ad hoc image pixels associated with the seat location.

7. The method of claim 1, wherein synchronize the display of the set of pixels to the timing reference uses time maintained in the mobile device.

8. The method of claim 7, wherein the mobile ad hoc imaging application receives a time value of a time at which the display of the set of pixels is to occur.

9. The method of claim 1 wherein the mobile ad hoc imaging application is further configured to:
display a second set of pixels associated with the seat location in the venue at a second time.

10. The method of claim 5 wherein generating the ad hoc image data structure for an image comprises generating the plurality of a set of pixels for display at a plurality of times.

11. The method of claim 10, wherein generating the plurality of the set of pixels for display at the plurality of times further comprises generating the plurality of the set of pixels for the plurality of times for a plurality of seat locations.

12. A system for providing an ad hoc image displayed in a venue comprising:
a server storing an ad hoc image data structure, where the ad hoc image data structure comprises a plurality of ad hoc image pixels, the server further storing a mobile ad hoc image application configured to
prompt a user to enter identification information,
determine a seat location within the venue for the user based on the identification information, where the seat location comprises a section number, row number, and seat number,
synchronize display of one of a plurality of ad hoc image pixels on a mobile device with respect to a timing reference, and
display one of the plurality of ad hoc image pixels in the venue at a first time.

13. The system of claim 12 wherein the server is configured to email the ad hoc image data structure to a plurality of users.

14. The system of claim 12, wherein each of the plurality of ad hoc image pixels is associated with a respective seat location of the venue.

15. The system of claim 14 wherein the mobile ad hoc image application is further configured to display another one of the plurality of ad hoc image pixels in the venue at a second time.

16. The system of claim 15 wherein the mobile device comprises a smart phone.

17. An instance of computer readable media comprising instructions that when executed cause a mobile computing device to:
prompt a user to enter identification information;
determine a seat location in a venue for the user based on the identification information;
retrieve an ad hoc image data structure comprising an ad hoc image pixel associated with the seat location;
ascertain a time associated with displaying the ad hoc image pixel;
determine a current time is the time associated with displaying the ad hoc image pixel; and
display the ad hoc image pixel.

18. The instance of computer readable media comprising instructions of claim 17, further comprising instructions causing the mobile computing device to:
select another ad hoc image pixel from the ad hoc image data structure associated with the seat location;
ascertain a second time associated with displaying the another ad hoc image pixel; and
display the another ad hoc image pixel.

19. The instance of computer readable media of claim 18 wherein ascertaining the time associated with displaying the ad hoc image pixel is indicated by data stored in a mobile ad hoc imaging application.

20. The instance of computer readable media of claim 19 wherein the instructions further cause the mobile device to receive the ad hoc image data structure as streaming data at the venue.

* * * * *